(12) United States Patent
Liu

(10) Patent No.: US 8,538,168 B2
(45) Date of Patent: Sep. 17, 2013

(54) IMAGE PATTERN MATCHING SYSTEMS AND METHODS FOR WAFER ALIGNMENT

(75) Inventor: Lisong Liu, Fremont, CA (US)

(73) Assignee: Raintree Scientific Instruments (Shanghai) Corporation, Shanghai (CN)

( * ) Notice: Subject to any disclaimer, the term of this patent is extended or adjusted under 35 U.S.C. 154(b) by 376 days.

(21) Appl. No.: 12/854,536

(22) Filed: Aug. 11, 2010

(65) Prior Publication Data

US 2011/0038527 A1 Feb. 17, 2011

(30) Foreign Application Priority Data

Aug. 12, 2009 (CN) .......................... 2009 1 0056304

(51) Int. Cl.
*G06K 9/62* (2006.01)
(52) U.S. Cl.
USPC ........ 382/209; 190/269; 190/145; 356/237.3; 356/124
(58) Field of Classification Search
USPC .............. 382/145, 209, 190, 269; 356/237.3, 356/124
See application file for complete search history.

(56) References Cited

U.S. PATENT DOCUMENTS

2008/0151234 A1* 6/2008 Imai et al. .................. 356/237.3

* cited by examiner

*Primary Examiner* — Matthew C Bella
*Assistant Examiner* — Ruiping Li
(74) *Attorney, Agent, or Firm* — Finnegan, Henderson, Farabow, Garrett & Dunner

(57) ABSTRACT

A computer-implemented image pattern matching method for wafer alignment is provided, for determining an overall similarity value and an overall geometry relationship between a target wafer image and a model wafer image. The method includes: determining a plurality of model patterns in the model wafer image; searching the target wafer image to identify a plurality of target patterns, thereby generating a plurality of matches each including a respective target pattern and model pattern; selecting, using multiple threshold values, ones of the plurality of matches according to a plurality of similarity values; and determining, using a predetermined algorithm and the selected ones of the matches, the overall similarity value and the overall geometry relationship between the target wafer image and the model wafer image.

24 Claims, 11 Drawing Sheets

IMAGE PATTERN MATCHING SYSTEMS AND METHODS FOR WAFER ALIGNMENT

RELATED APPLICATIONS

This application is based upon and claims the benefit of priority from Chinese Patent Application No. 200910056304.9, filed Aug. 12, 2009, the entire contents of which are incorporated herein by reference.

FIELD

This application generally relates to image pattern matching systems and methods, and more particularly, relates to image pattern matching systems and methods for wafer alignment in manufacture or inspection machines of a semiconductor large-scale-integrated-circuit (LSIC).

BACKGROUND

In the process of manufacturing or inspecting an LSIC, a wafer may go through multiple processing stages by different systems. Typically, a first step of the processing stages is to perform wafer alignment on those systems.

FIG. 1 illustrates a diagram of a traditional system 100 for wafer alignment in the manufacture or inspection of an LSIC. System 100 may include a motion stage 102, an industrial camera 104, and a lighting source 106. Camera 104 may acquire images of sites of interest on a wafer placed on motion stage 102, e.g., a patterned wafer 112. System 100 may also include a robot (not shown), a pre-aligner (not shown), and a chuck (not shown) on top of the motion stage 102. The chuck, also known as a wafer adaptor, is located on top of motion stage 102 to hold wafer 112. The chuck may provide vacuum or electrostatic force to tightly hold wafer 112. System 100 may additionally include a host computer (not shown) for image acquisition, algorithm computation, image display, result display, user input, etc.

During the manufacture or inspection process, the robot takes wafer 112 from a wafer cassette (not shown), and places wafer 112 on the pre-aligner (not shown). The pre-aligner roughly determines orientation of wafer 112 according to a notch or a short straight/flat edge 114 in wafer 112. For example, almost all wafers of 300-mm diameter have a notch on their edges, and some wafers of 200-mm diameter have a short straight/flat edge. Such a notch, or straight/flat edge roughly indicates the orientation of the wafer defined by the boundaries of dice printed on the wafer periodically. The robot then transports wafer 112 onto motion stage 102. Motion stage 102 may move in a horizontal plane, also known as an X-Y plane (X and Y directions shown in FIG. 1), and rotate with respect to its center. Motion stage 102 may also move along a vertical (Z) direction (also shown in FIG. 1).

When system 100 performs work on wafer 112, orientation of wafer 112 relative to motion stage 102 is generally important. For example, for a wafer inspection system, a thin-film (TF) measurement system, an optical critical dimension (OCD) measurement system, or a scanning electron microscope (SEM) system (e.g., CD-SEM system), a laser or an electron beam may be used to scan an area in a die on wafer 112 to acquire an image of the area, and the image may have a pixel size of tens of nanometers or even several nanometers. Because the field of view (FOV) of camera 104 is relatively small, if wafer 112 is not well aligned, it is difficult to accurately locate a site of interest on wafer 112 at a nanometer or sub-nanometer scale.

The surface of wafer 112 typically contains a plurality of repeated rectangular modules 116, also known as dice. Ideally, the dice are identical in function and design on a given wafer. However, in reality, some dice on a given wafer may be slightly different than others due to processing condition drift. Each die is surrounded by horizontal and perpendicular carved border lines, and contains integrated circuitry therein, which may be a logical unit such as a central processing unit (CPU) or a memory unit. Between two adjacent dice, there is generally a fixed distance, e.g., 10 microns, in the horizontal direction, i.e., the X direction, and in the perpendicular direction, i.e., the Y direction. An area formed between the dice is known as a street. Boundaries of the dice and internal patterns of the dice generally include dominant horizontal and perpendicular lines, which determine the orientation of the wafer as a whole. When system 100 performs work on wafer 112, system 100 aligns wafer 112 with motion stage 102. More particularly, system 100 may measure a skew angle between wafer 112 and motion stage 102, and then rotate motion stage 102 to align it with wafer 112 within a predefined error range.

FIG. 2 shows a top view 200 of wafer 112 to be aligned with a motion stage, such as motion stage 102 shown in FIG. 1, based on a traditional method. Referring to FIG. 2, similar to the above description of FIG. 1, the robot takes wafer 112 out of the cassette and places it onto the pre-aligner. The pre-aligner may roughly determine the orientation of wafer 112 according to notch 114 in wafer 112. The robot may then place wafer 112 onto the motion stage, whose orientation may be represented by the X and Y axes shown in FIG. 2, for alignment. As a result of this pre-alignment, a skew angle 202 between wafer 112 and the motion stage may be limited within a relatively small range, e.g., 0.2 degree, and the center of wafer 112 may be close to the center of the motion stage within a certain distance. FIG. 2 shows skew angle 202 and a FOV 204 of the camera 104 (shown in FIG. 1).

After the pre-alignment, alignment may be performed by measuring skew angle 202 between wafer 112 and the motion stage, i.e., the orientation of wafer 112 relative to the motion stage. Skew angle 202 may then be corrected by rotating the motion stage with respect to its center. For different systems or applications, requirements for wafer alignment accuracy may differ. For example, skew angle 202 may need to be corrected within 0.0001 degree for certain systems.

Traditionally, in order to determine the orientation of a wafer relative to the motion stage, a user may select first and second images of two similar sites, respectively, located along a die row, approximately in a line but far away from each other on the wafer. The first and second selected images may contain rich characteristic patterns of, e.g., horizontal and perpendicular edges or corners on different die. The greater the distance is between the two sites, the smaller the relative error is in measuring the skew angle between the wafer and the motion stage. Taking into account the error in placement of the wafer center in wafer loading and the skew angle, initially selecting two sites near the wafer center is generally preferred. After successfully performing image pattern matching at the initial two sites, additional sites with a greater distance from each other may be used to acquire subsequent images, and the skew angle may be determined by the initial two sites, two far sites in opposite direction, or the additional sites using line fitting methods, e.g., a least square line fitting method. Traditionally, image pattern matching methods may be used to determine locations of the sites based on which the skew angle may be determined.

Based on image pattern matching methods, a sub-image, also known as a region of interest (ROI), including a pattern in the first selected image, may be preprocessed and verified for its quality including uniqueness within the image, i.e., within the field of view of the camera. The first selected image is referred to herein as a model image, also known as a template image or a kernel image, and the pattern is referred to herein as a model pattern, also known as a template pattern or a kernel pattern. The model pattern may then be used to search for a matching pattern, referred to herein as a target pattern, in the second selected image, referred to herein as a target image, with sub-pixel accuracy. Normally, the user determines the two sites and performs a wafer alignment for a wafer, and saves the model image, the site locations, and the sub-image including the model pattern in a file called a recipe. This process is called a recipe creation process. A subsequent process, i.e., the recipe execution process, is the actual working process, where the robot places pre-aligned wafers onto the motion stage, one at a time, and the motion stage automatically moves so that the camera may acquire wafer images at the site locations saved in the recipe. The model pattern saved in the recipe may further be used to perform pattern matching on the acquired images, to determine accurate site locations on the wafer where the images are acquired. In this way, locations of two similar sites on the wafer and, hence, a slope of the line passing the two sites, may be determined. Therefore the orientation of the wafer may also be determined. In recipe execution, there is no user interaction, i.e., the process is automatic. One recipe can be used for many wafers of the same type and for the same process. In addition, to determine displacement between two images, pattern matching may also include determining a relatively small rotation and scaling between a model image and a target image.

Wafer images may be acquired by the camera using a variety of imaging techniques, such as a charge-coupled device (CCD) based imaging technique, a complementary metal-oxide-semiconductor (CMOS) based imaging technique, an X-ray imaging technique, or an electron-beam or ion-beam imaging technique, such as a scanning electron microscopy (SEM) or focused ion beam (FIB) microscopy imaging technique. For different formats of images, different image pattern matching methods may be used. For example, for gray-scale images, a normalized cross-correlation (NCC) algorithm may be used. Also, for example, other algorithms such as a Boolean "AND" operation may be used for binary images. Further, for example, a Hausdorff Distance method may be used for binary images after edge detection.

Traditionally, matching results are typically normalized to values between 0 and 1, inclusive, where 0 corresponds to a minimum similarity value (indicating that a target pattern does not match a model pattern), and 1 corresponds to a maximum similarity value (indicating that a target pattern exactly matches a model pattern). When the matching result between a target pattern and a model pattern reaches a threshold value, which is normally empirically predetermined, such as 0.7, the target pattern and the model pattern may be considered matching. When a target pattern in a target image matches a model pattern in a model image, the relative geometric relationship between the target pattern and the model pattern may be considered as the relative geometric relationship between the target image and the model image, which is necessary when the distance of the two imaging sites on wafer are known (can easily be obtained from the stage coordinate at the two sites).

In reality, however, image degradation factors exist, such as drift of a lithography system in the lithography process performed on wafers, including exposure time and focus drift, drift of the overall imaging system from its optimal condition, system noise, illumination changes, wafer surface damage, local image distortion, and wafer material and thin-film structure variations. These degradation factors may cause poor pattern matching and result in wafer alignment failure. The cost for such failure may be high, especially when the system is an online system being used to manufacture wafers.

A possible method to solve the above issue is to use multiple model patterns in a model image for pattern matching in order. For example, the user may select multiple model patterns in the model image, and the host computer searches a target image to identify a target pattern matching a first one of the multiple model patterns. If a target pattern matching the first model pattern cannot be identified, e.g., a similarity value between any target pattern in the target image and the first model pattern is smaller than a predetermined threshold value, the host computer may search the target image to identify a target pattern matching a second one of the multiple model patterns. This process may repeat, until the host computer identifies a target pattern in the target image matching a model pattern in the model image. A relative geometric relationship between that target pattern and that model pattern may then be used to determine the relative geometric relationship between the target image and the model image. If all of the similarity values for the multiple model patterns are smaller than the predetermined threshold value, the image pattern matching is considered to fail. Since this method uses multiple model patterns one at a time, the predetermined threshold value may need to be relatively high to achieve good performance. Therefore, when wafer image quality is not sufficiently good, alignment performance may be degraded.

SUMMARY

According to a first aspect of the present disclosure, there is provided a computer-implemented image pattern matching method for wafer alignment, for determining an overall similarity value and an overall geometry relationship between a target wafer image and a model wafer image, the method comprising: determining a plurality of model patterns in the model wafer image; searching the target wafer image to identify a plurality of target patterns, one of the plurality of target patterns matching a corresponding one of the plurality of model patterns, thereby generating a plurality of matches each including a respective target pattern and model pattern; selecting, using multiple threshold values, ones of the plurality of matches according to a plurality of similarity values, each one of the plurality of matches having one of the plurality of similarity values indicating a similarity between the target pattern and the model pattern in the one of the plurality of matches; and determining, using a predetermined algorithm and the selected ones of the matches, the overall similarity value and the overall geometry relationship between the target wafer image and the model wafer image.

According to a second aspect of the present disclosure, there is provided an image pattern matching system for performing wafer alignment, comprising: a wafer imaging device for acquiring an image of a wafer as a target wafer image; a model pattern determining device for determining a plurality of model patterns in a stored model wafer image; a pattern matching device for searching, using an image pattern matching technique, the target wafer image to identify a plurality of target patterns, one of the plurality of target patterns matching a corresponding one of the plurality of model patterns, thereby generating a plurality of matches each including a respective target pattern and model pattern; a match selecting device for selecting, using multiple threshold values, ones of the plurality of matches according to a plurality of similarity values, each one of the plurality of matches having one of the plurality of similarity values indicating a similarity between the target pattern and the model pattern in the one of the plurality of matches; and a computing device for determining, using a predetermined algorithm and the selected ones of the matches, the overall similarity value and the overall geometry relationship between the target wafer image and the model wafer image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the disclosure and, together with the description, serve to explain the principles of the disclosure.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the disclosure do not represent all possible implementations. Instead, they are merely examples of systems, devices and methods consistent with aspects related to the disclosure and as recited in the appended claims.

Figure 1:
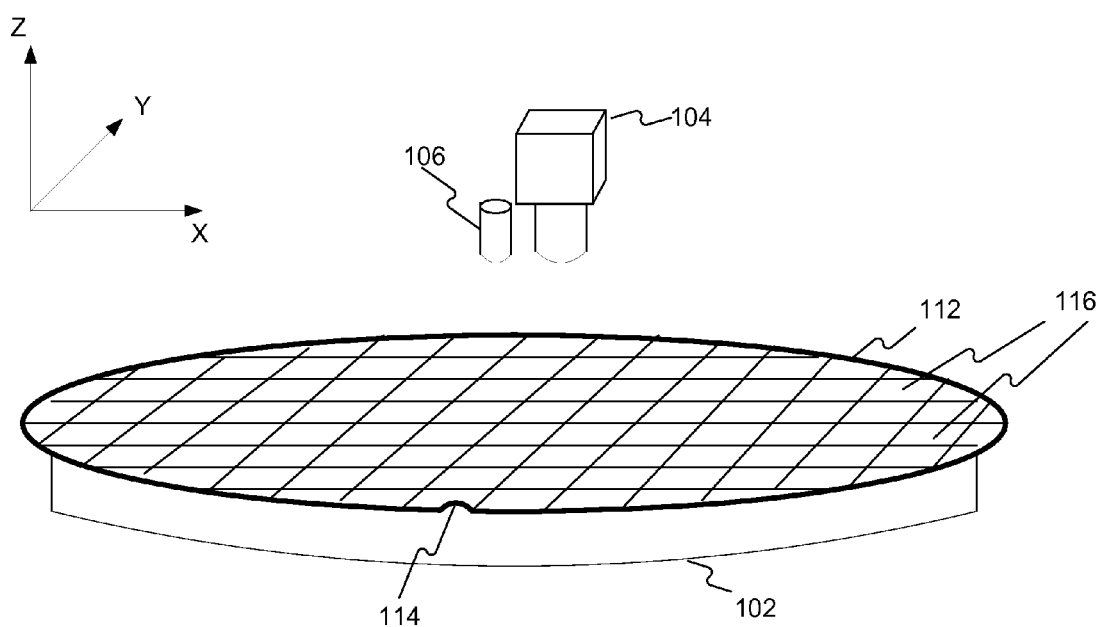
FIG. 1 illustrates a diagram of a traditional system for wafer alignment in manufacture or inspection of an LSIC.
Figure 2:
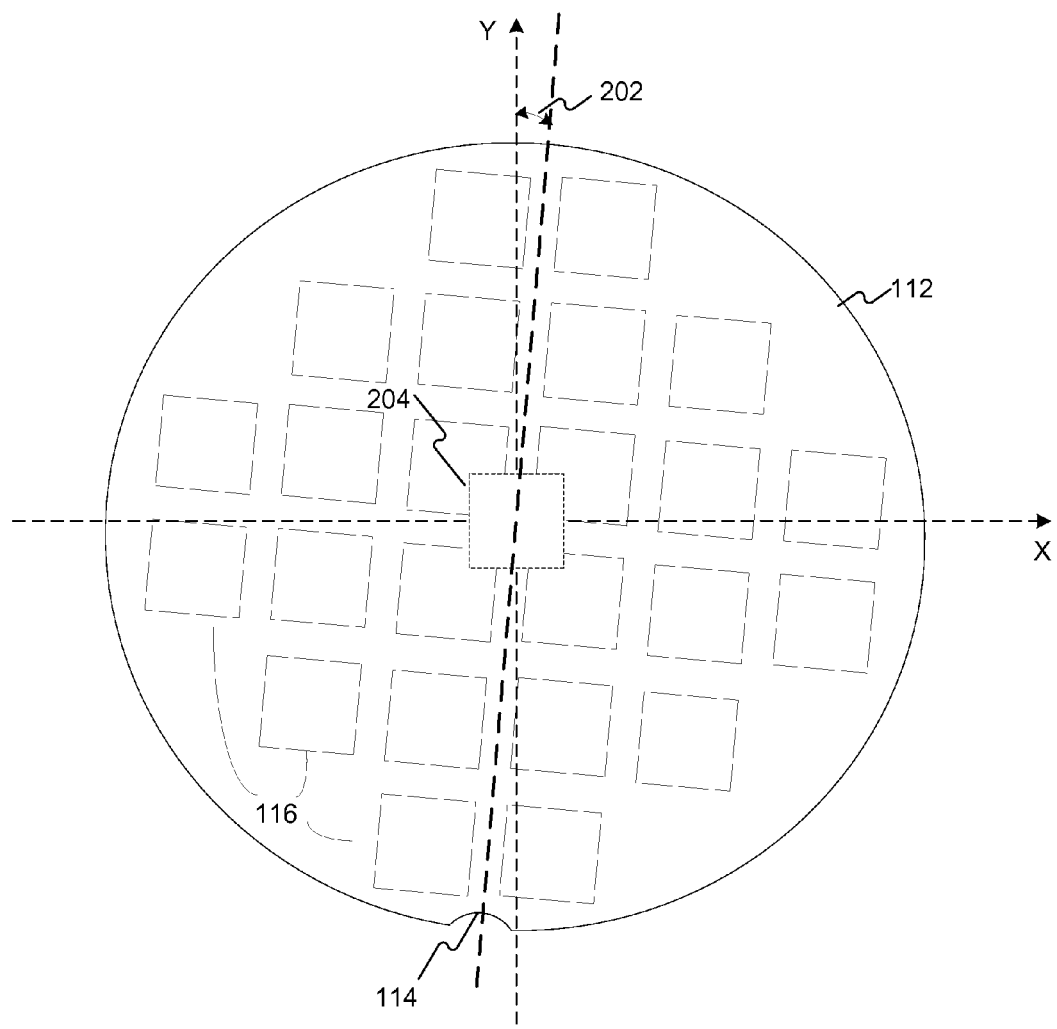
FIG. 2 shows a top view of a wafer to be aligned with a motion stage based on a traditional method.
Figure 3:
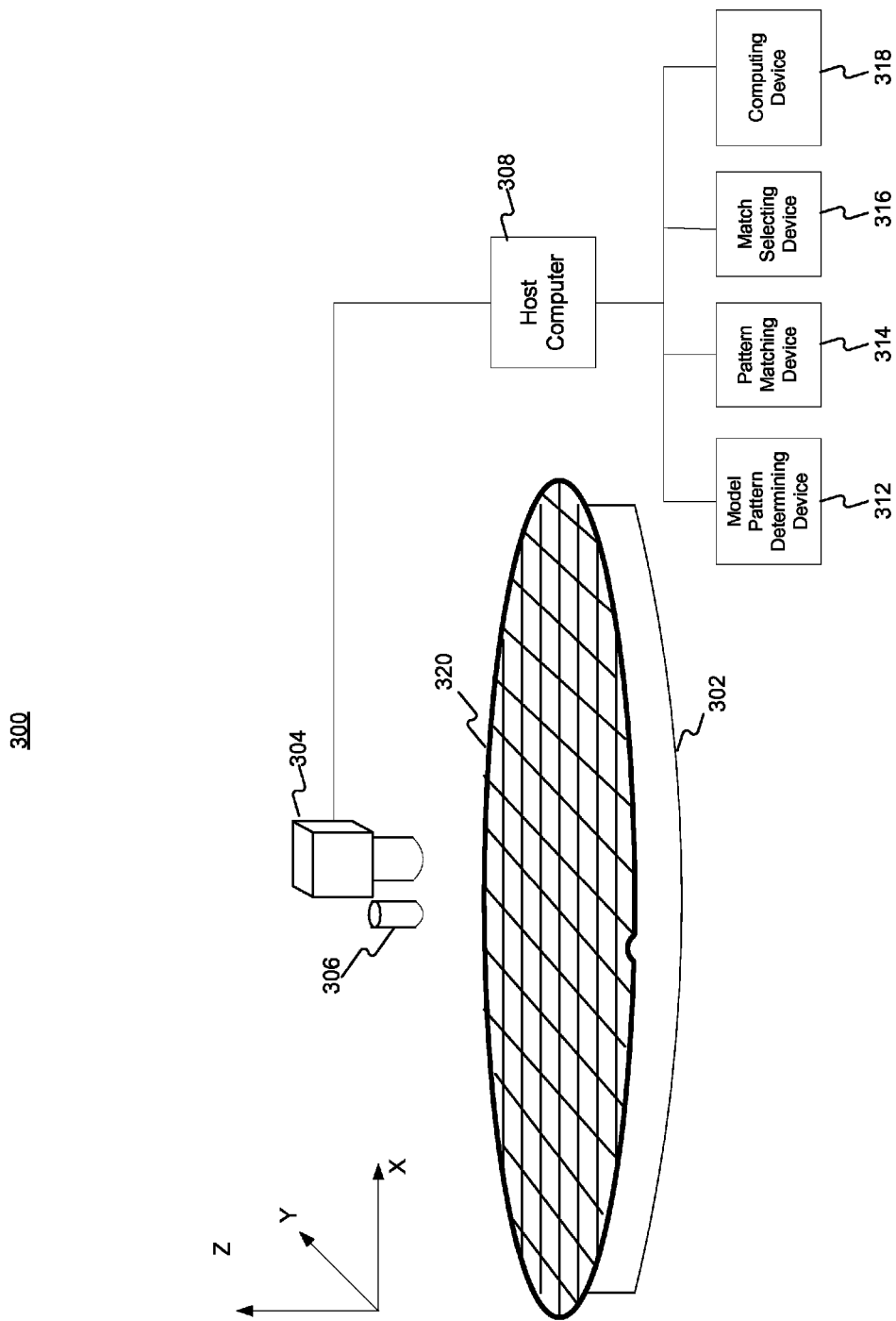
FIG. 3 illustrates a diagram of a system to perform image pattern matching for wafer alignment, according to an exemplary embodiment.

FIG. 3 illustrates a diagram of a system 300 to perform image pattern matching for wafer alignment, according to an exemplary embodiment. System 300 may include motion stage 302 and an imaging device including, e.g., camera 304 and lighting source 306. Camera 304 may acquire images of a wafer 320 placed on motion stage 302. System 300 may also include a robot (not shown), a pre-aligner (not shown), and a chuck (not shown). The chuck, also known as a wafer adaptor, is located on top of motion stage 302 to hold wafer 320. The chuck may provide vacuum or electrostatic force to tightly hold wafer 320. In addition, system 300 may include host computer 308 for image acquisition, algorithm computation, image display, result display, user input, etc.

In exemplary embodiments, system 300 may further include a model pattern determining device 312, a pattern matching device 314, a match selecting device 316, and a computing device 318. For example, a portion or all of these devices 312, 314, 316, and 318 may be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, or a single central processing unit (CPU). Alternatively/additionally, a portion or all of these devices may be implemented as software applications installed on host computer 308. These devices will be described in detail below.

In exemplary embodiments, the pre-aligner pre-aligns wafer 320 and the robot places the pre-aligned wafer on motion stage 302, similar to the above description. Wafer 320 may be a wafer of any size, such as, for example, a 4-inch wafer, a 5-inch wafer, a 6-inch wafer, a 12-inch wafer (i.e., 300 mm wafer), or an 18-inch wafer. Camera 304 may then acquire a target image of wafer 320 in a certain field of view (FOV), and send the target image to host computer 308 for processing and display. Camera 304 may also acquire a model image of wafer 320. Alternatively, the model image may be acquired in advance.

Figure 4:
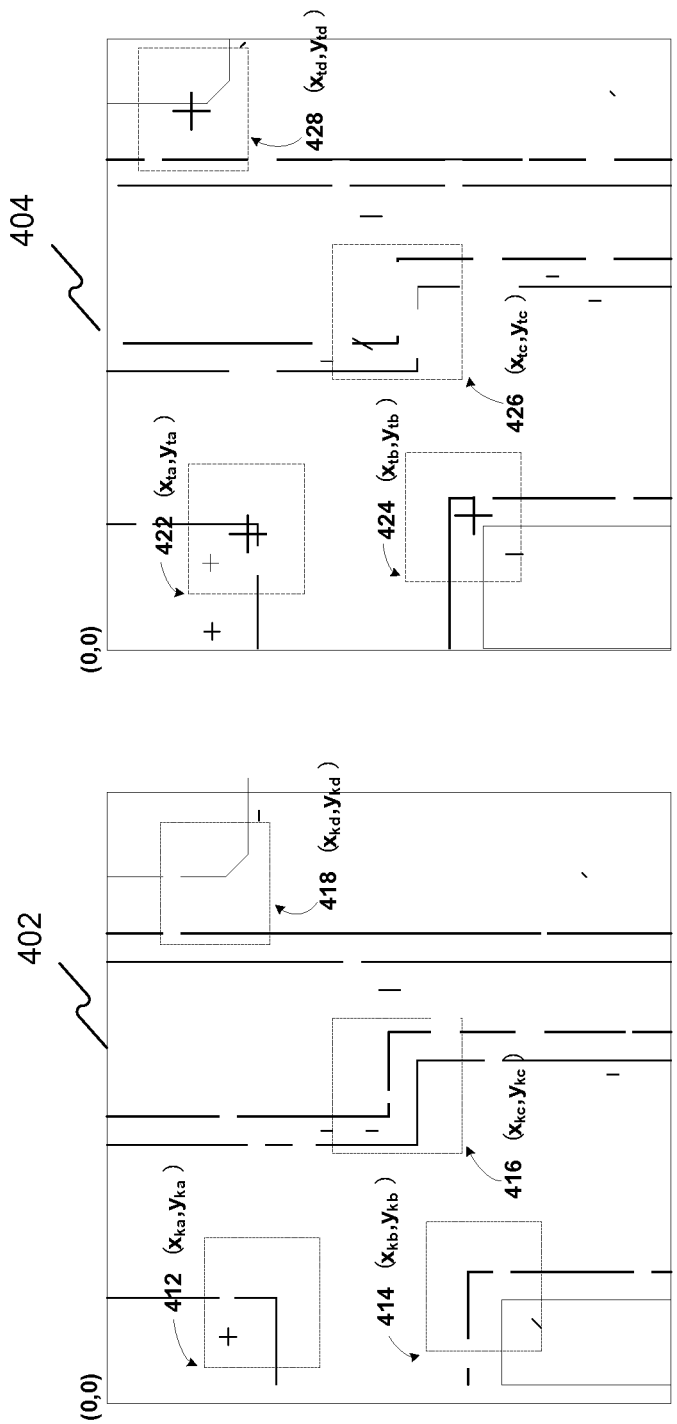
FIG. 4 illustrates a model image and a target image of a wafer, according to an exemplary embodiment.

FIG. 4 illustrates a model image 402 and a target image 404 of a wafer, such as wafer 320 (shown in FIG. 3), according to an exemplary embodiment. Referring to FIG. 4, model image 402 includes a part of a die corresponding to a first site on the wafer. Model image 402 may be acquired onsite, or acquired in advance and stored in a memory of host computer 308 (shown in FIG. 3). Target image 404 includes a part of a die corresponding to a second site that is in the same row/column as the first site on the wafer. As a result, the first and second sites may form a straight line on the wafer, which may be used to determine orientation of the wafer relative to motion stage 302 (shown in FIG. 3).

In exemplary embodiments, model image 402 and target image 404 may be black and white binary images, grayscale images, or color images, and may be acquired using different imaging techniques such as a charge-coupled device (CCD) based imaging technique, a complementary metal-oxide-semiconductor (CMOS) based imaging technique, an X-ray imaging technique, or an electron-beam or ion-beam imaging technique. The format of model image 402 or target image 404 may be a raw format (an original array), a bitmap (BMP), or a tagged image file format (TIFF), or any suitable digital image format. Model image 402 and target image 404 may be compressed or uncompressed, and may be in any pixel bit depth. Model image 402 and target image 404 will be described in more detail below.

Figure 5:
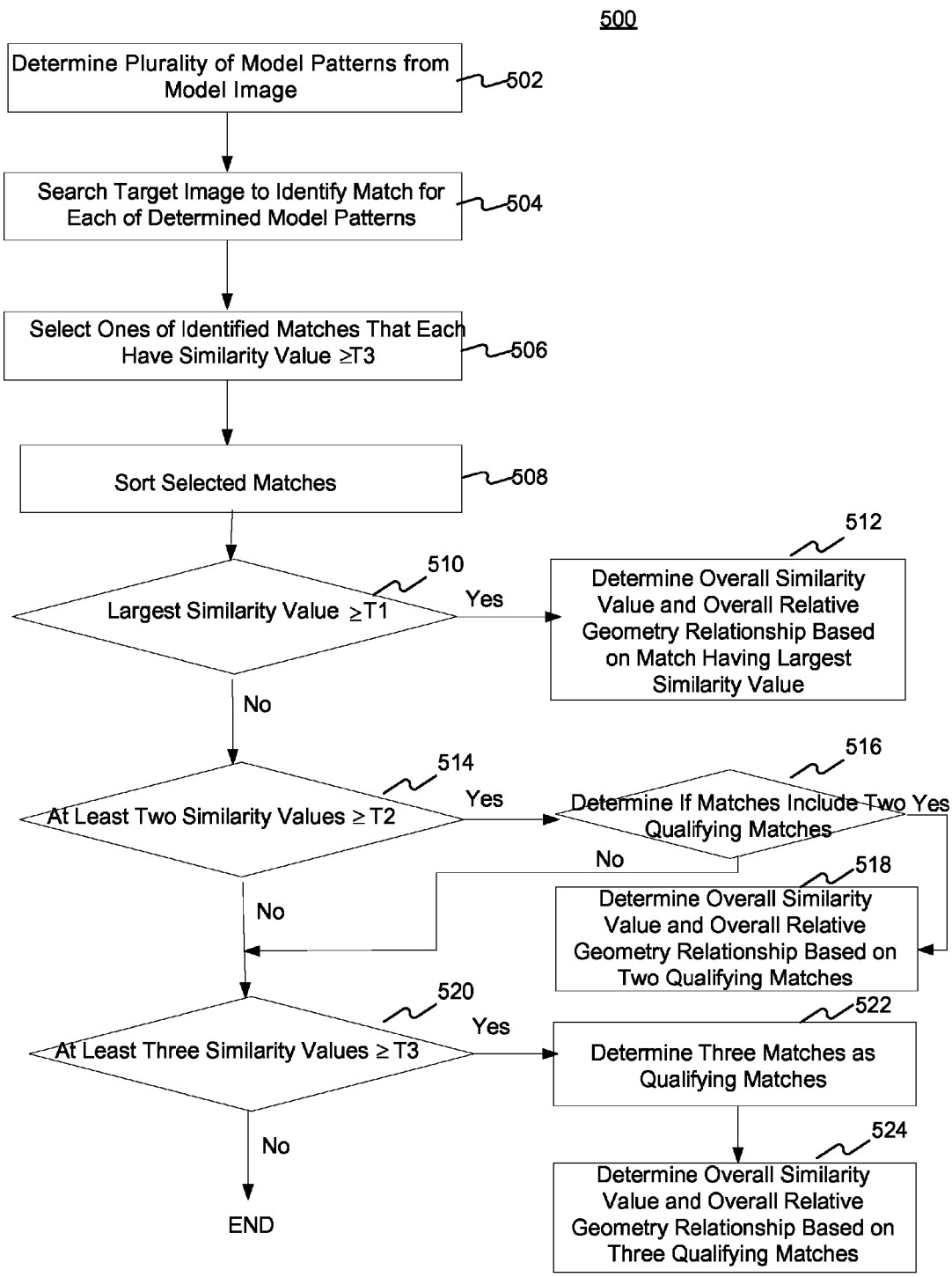
FIG. 5 illustrates a flowchart of a method to perform image pattern matching for wafer alignment, according to an exemplary embodiment.

FIG. 5 illustrates a flowchart of a method 500 for system 300 (shown in FIG. 3) to perform image pattern matching for wafer alignment, according to an exemplary embodiment. Referring to FIGS. 3-5, model pattern determining device 312 determines a plurality of model patterns, also referred to as template patterns or kernel patterns, from the model image 402 (step 502). Different from traditional methods, at least two different model patterns are determined in model image 402. The model patterns are generally characteristic patterns, e.g., horizontal and perpendicular edges or corners. The model patterns may be automatically determined based on certain algorithms that detect features on model image 402, and may also be determined by a user from all patterns in model image 402, which may be demonstrated on a graphical user interface (GUI) of host computer 308. For illustrative purposes only, as shown in FIG. 4, it is assumed that first, second, third, and fourth model patterns 412, 414, 416, and 418 are determined in model image 402.

In exemplary embodiments, and before pattern matching, system 300 may preprocess model image 402 and target image 404, including automatic focusing, and filtering such as noise filtering, smoothing, edge detection, etc.

Still referring to FIGS. 3-5, after the plurality of model patterns, i.e., model patterns 412, 414, 416, and 418, are determined in model image 402, pattern matching device 314 performs pattern matching on each of the model patterns by searching, based on an image pattern matching technique, target image 404, or a specified area in target image 404, to identify a match for each of the model patterns (step 504). As shown, for example, in FIG. 4, pattern matching device 314 may identify a first target pattern 422, a second target pattern 424, a third target pattern 426, and a fourth target pattern 428 in target image 404, to match model patterns 412, 414, 416, and 418 in model image 402, respectively, thereby generating a plurality of matches, e.g., matches "a," "b," "c," and "d," each including a target pattern and a model pattern. For example, the match "a" includes target pattern 422 and model pattern 412, match "b" includes target pattern 424 and model pattern 414, match "c" includes target pattern 426 and model pattern 416, and match "d" includes target pattern 428 and model pattern 418. In exemplary embodiments, different algorithms may be applied to identify these matching target patterns. For example, a normalized cross-correlation (NCC) algorithm may be applied when model image 402 and target image 404 are grayscale images.

Figure 6:
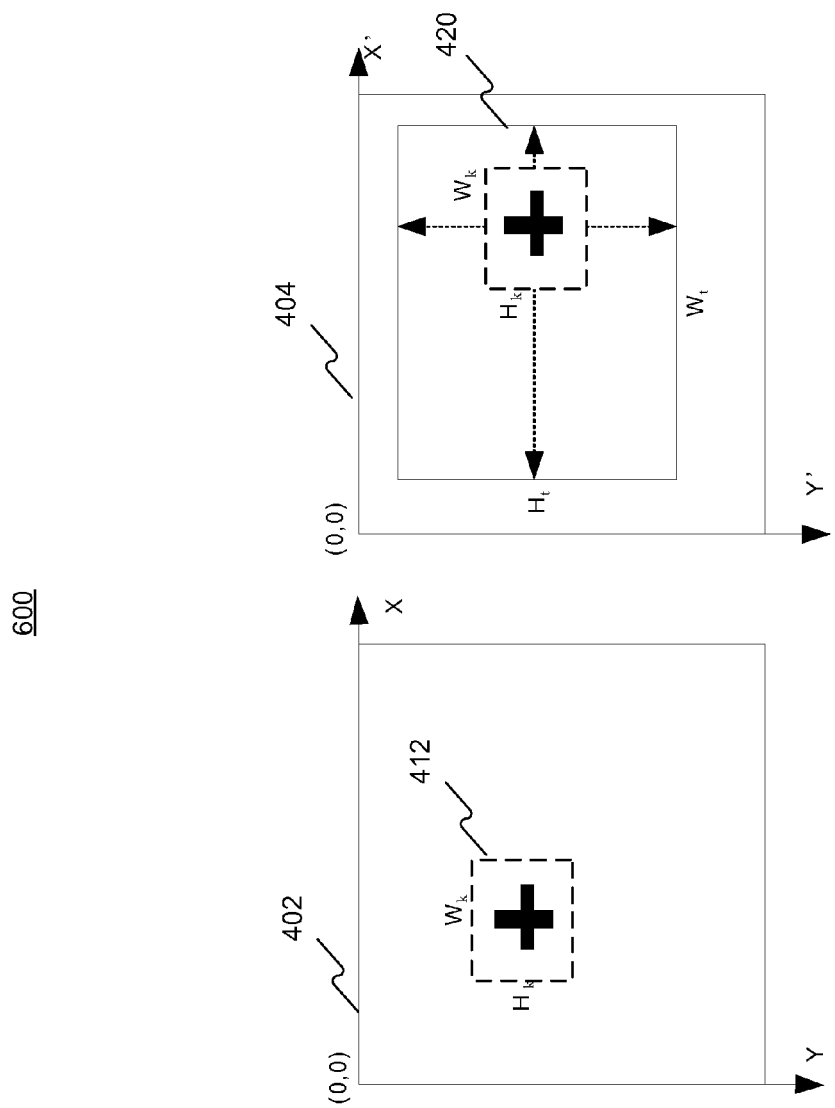
FIG. 6 illustrates a method to identify a target pattern in a target image to match a model pattern in a model image, according to an exemplary embodiment.

In exemplary embodiments, pattern matching device 314 may perform pattern matching as described below in FIGS. 6-8. FIG. 6 illustrates a method 600 to identify a target pattern in target image 404 to match a model pattern in model image 402, e.g., model pattern 412, according to an exemplary embodiment. In the exemplary embodiment, model pattern 412 has a width of $W_k$ and a height of $H_k$ in pixels, and a specified search area 420 in the target image 404 has a width of $W_t$ and a height of $H_t$ in pixels. In general, $W_t$ is greater than $W_k$, and $H_t$ is greater than $H_k$.

Referring to FIG. 6, in exemplary embodiments, pattern matching device 314 (shown in FIG. 3) may compare model pattern 412 with a target pattern in each rectangular area in search area 420 that has a width of $W_k$ and a height of $H_k$, and compute a similarity value between model pattern 412 and the target pattern. For example, pattern matching device 314 may perform a similarity computation based on a normalized cross-correlation (NCC) algorithm in a spatial domain, as follows:

$$r = \frac{N\sum KT - (\sum K)\sum T}{\sqrt{[N\sum K^2 - (\sum K)^2][N\sum T^2 - (\sum T)^2]}}, \quad \text{equation (1)}$$

where K is a pixel grayscale value in model pattern 412, T is a pixel grayscale value of a corresponding pixel in the target pattern, N is a total number of pixels in model pattern 412, and r is the computed similarity value, i.e., a matching result, which is normalized to a value between 0 and 1, inclusive, or converted to a percentage between 0% and 100%, inclusive. The greater the similarity value r is between model pattern 412 and a target pattern, the better the similarity is between model pattern 402 and the target pattern. In one exemplary embodiment, to speed up the similarity computation, down-sampling may be used before performing the computation. For example, pattern matching device 314 may perform the similarity computation between a down-sampled version of model pattern 412 and each of a plurality of down-sampled target patterns, for a rough search to identify a candidate area in target image 404 which is also down-sampled at the same level, and then perform a fine search for the target pattern matching model pattern 412 without down-sampling in the candidate area.

In the above embodiment, pattern matching device 314 performs the similarity computation based on the NCC algorithm in the spatial domain. Other pattern matching or similarity computation methods, e.g., the NCC algorithm using magnitude or phase in a frequency/Fourier domain, may also be used to perform pattern matching on grayscale images. In addition, for example, a Boolean "exclusive OR" operation may be used to perform pattern matching on binary images.

As described above, pattern matching device 314 compares model pattern 412 with the target pattern corresponding to each rectangular area in the search area 420, and performs the similarity computation for each rectangular area. Accordingly, a plurality of similarity values are obtained, which may be expressed in an array, also known as a correlation surface.

Figure 7:
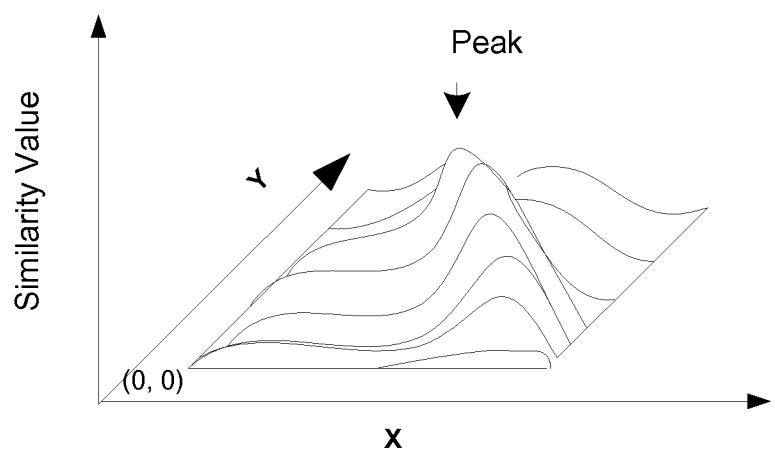
FIG. 7 shows an exemplary correlation surface, according to an exemplary embodiment.

FIG. 7 shows an exemplary correlation surface 700, according to an exemplary embodiment. For example, correlation surface 700 may be the correlation surface between model pattern 412 and search area 420 (shown in FIG. 6), and therefore have a width of $W_c$ and a height of $H_c$ as follows:

$$W_c = (W_T - W_k)$$

$$H_c = (H_T - H_k). \quad \text{equation (2)}$$

Referring to FIGS. 6 and 7, each point on correlation surface 700 represents a computed similarity value, i.e., a matching result, between model pattern 412 and a target pattern corresponding to a rectangular area in target image 404. For example, the point on correlation surface 700 located at (0, 0) corresponds to the matching result between model pattern 412 and the target pattern in the rectangular area in the upper-left corner of search area 420, that target pattern having the same size as model pattern 412. In this example, the point on correlation surface 700 located at (0, 0) is representative of essentially no similarity between model pattern 412 and the rectangular area in the upper-left corner of search area 420.

Since each rectangular area in search area 420 uses pixel as a basic unit, a peak on the correlation surface 700 has corresponding pixel accuracy. In exemplary embodiments, a peak with sub-pixel accuracy on the correlation surface 700 may further be determined through curve fitting and interpolation, such as one-dimensional (1D) fitting in the horizontal direction, i.e., the X direction, and in the perpendicular direction, i.e., the Y direction, and two-dimensional (2D) fitting in the X-Y plane. For example, 2D fitting to a quadratic surface may be possible, although it may require a greater amount of computation time compared to 1D fitting.

Figure 8:
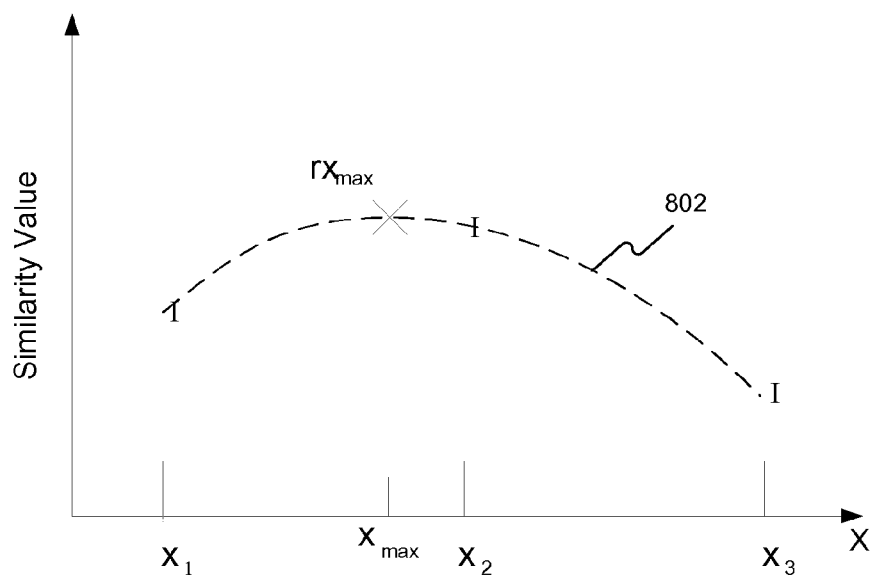
FIG. 8 illustrates a curve fitting method based on 1D fitting, according to an exemplary embodiment.

FIG. 8 illustrates a curve fitting method 800 based on 1D fitting, according to an exemplary embodiment. Referring to FIG. 8, a quadratic curve function 802, e.g., $r(x)=ax^2+bx+c$, may be used to fit to first, second, and third points $x_1$, $x_2$, and $x_3$ on the correlation surface in the X direction, where $x_2$ is a location of the peak with pixel accuracy on the correlation surface in the X direction, and $x_1$ and $x_3$ are neighbor points of $x_2$ in the X direction. By fitting to the points $x_1$, $x_2$, and $x_3$, solutions of a, b, and c may be determined, and a peak with sub-pixel accuracy with a location $x_{max}$ and a value $rx_{max}$ may then be determined. Similarly, a peak with sub-pixel accuracy with a location $y_{max}$ and a value $ry_{max}$ may also be determined based on first, second, and third points $y_1$, $y_2$, and $y_3$ on the correlation surface in the Y direction. An overall peak value $r_{max}$ with sub-pixel accuracy may be determined to be a larger one of the peak values $rx_{max}$ and $ry_{max}$.

In exemplary embodiments, based on the methods 600 (shown in FIG. 6) and 800 (shown in FIG. 8), pattern matching device 314 (shown in FIG. 3) identifies target patterns 422, 424, 426 and 428 in target image 404, to match model patterns 412, 414, 416 and 418 (shown in FIG. 4), respectively, thereby generating the matches a, b, c, and d. System 300 also obtains similarity values $r_a$, $r_b$, $r_c$, and $r_d$ for matches a, b, c, and d, respectively.

In exemplary embodiments, pattern matching device 314 may additionally perform pattern matching based on geometry relationships between a model pattern and a target pattern, including location offsets, a rotation angle, or a scaling ratio between the model pattern and the target pattern. For example, assuming that a model pattern located at $(x_k, y_k)$ in a model image with an upper-left corner of the model image being a coordinate origin, and that a target pattern located at $(x_t, y_t)$ in a target image with an upper-left corner of the target image being a coordinate origin, location offsets dx in the x direction and dy in the y direction between the model pattern and the target pattern may be determined as $dx=x_t-x_k$ and $dy=y_t-y_k$. Also for example, the model pattern may be rotated at various angles around a nominal angle, perform pattern matching at each rotation angle to obtain the best matching results at the angle, and the final best matching for that kernel in target image may be obtained by fitting matching results in a curve and identifying the curve peak. This will provide not only a match and its similarity value, but also an angle offset dθ. Similarly, the model pattern may be scaled around a nominal size, perform pattern matching at each scale to obtain the best matching results at the scale, and the final best matching for that kernel in target image may be obtained by fitting matching results in a curve and identifying the curve peak. A matching scale ds can then be obtained.

Referring back to FIGS. 3-5, after pattern matching, match selecting device 316 selects one or more of the matches a, b, c, and d based on one or more threshold values. For convenience of illustration, it is assumed that model pattern 412, 414, 416, or 418 is located at $(x_{ki}, y_{ki})$ in model image 402 with an upper-left corner of the model image 402 corresponding to a coordinate origin, and that target pattern 422, 424, 426, or 428 is located at $(x_{ti}, y_{ti})$ in the target image 404 with an upper-left corner of target image 404 corresponding to a coordinate origin, where "i" represents "a," "b," "c," or "d." Accordingly, location offsets between the target pattern and the model pattern in the match i are $dx_i=x_{ti}-x_{ki}$ in the X direction and $dy_i=y_{ti}-y_{ki}$ in the Y direction. In addition, it is assumed that a relative rotation angle for the match i is $dθ_i$, and that a relative scaling ratio for the match i is $ds_i$.

In exemplary embodiments, the one or more threshold values may be predetermined including, e.g., first, second, and third threshold values $T_1$, $T_2$, and $T_3$, where $T_1 > T_2 > T_3$. $T_1$, $T_2$, and $T_3$ may be predetermined by the user, or by software installed on system 300.

In exemplary embodiments, match selecting device 316 selects ones of the matches a, b, c, and d (described above) that each have a similarity value greater than or equal to the lowest threshold $T_3$ for further determination (step 506). In the illustrated embodiment, the similarity value $r_a$ of the match a, the similarity value $r_b$ of the match b, and the similarity value $r_d$ of the match d are each greater than or equal to the lowest threshold value $T_3$, while the similarity value $r_c$ of the match c is smaller than the lowest threshold value $T_3$. In this example, match selecting device 316 selects matches a, b, and d for further determination.

In exemplary embodiments, match selecting device 316 may further sort the selected matches, e.g., matches a, b, and d, based on their similarity values (step 508). In the illustrated embodiment, for example, $r_a > r_d > r_b$. Accordingly, after sorting, the selected matches are match a, match d, and match b, in descending order of similarity value.

In exemplary embodiments, match selecting device 316 also determines if any of the selected matches has a relative large similarity value, so that that match may be used to determine an overall similarity value and an overall geometry relationship between target image 404 and model image 402. More particularly, match selecting device 316 determines if a largest one of the similarity values of the selected matches a, d, and b is greater than or equal to the highest threshold value $T_1$ (step 510). For example, T1 may be set to be equal to 0.75, when the NCC algorithm is used for pattern matching.

If the largest one of the similarity values of the selected matches a, d, and b, i.e., the similarity value $r_a$ of the match a, is greater than or equal to the highest threshold value T1, computing device 318 determines the similarity value $r_a$ and the geometry relationship of the match a as the overall similarity value and the overall geometry relationship, respectively, between target image 404 and model image 402 (step 512). More specifically, in the illustrated embodiment, the similarity value between target pattern 422 and model pattern 412 is $r_a$, the relative rotation angle between target pattern 422 and model pattern 412 is $dθ_a$, and the scaling ratio between target pattern 422 and model pattern 412 is $ds_a$. In addition, the location offsets between target pattern 422 and model pattern 412 are $dx_a = x_{ta} - x_{ka}$ in the X direction and $dy_a = y_{ta} - y_{ka}$ in the Y direction. Accordingly, computing device 318 determines the overall similarity value R, the overall relative location offsets Dx and Dy, the overall relative rotation angle Dθ, and the overall scaling ratio Ds, all between target image 404 and model image 402, as follows:

$$Dx = dx_a = x_{ta} - x_{ka}$$

$$Dy = dy_a = y_{ta} - y_{ka}$$

$$R = r_a$$

$$Dθ = dθ_a$$

$$Ds = ds_a. \quad \text{equation (3)}$$

In exemplary embodiments, if all of the similarity values of the selected matches a, d, and b are smaller than the highest threshold value T1, match selecting device 316 further selects multiple matches from the matches a, d, and b that each have a similarity value greater than or equal to the second threshold value T2 or the lowest threshold value T3.

In an exemplary embodiment, match selecting device 316 determines if at least two of the matches a, d, and b each having a similarity value greater than or equal to the second threshold value $T_2$ (step 514). For example, T2 may be set to be equal to 0.45, when the NCC algorithm is used for pattern matching.

In this example, the matches a, d, and b all have a similarity value greater than or equal to the second threshold value $T_2$. Therefore, match selecting device 316 determines that there are at least two matches each having a similarity value greater than or equal to the second threshold value $T_2$. Match selecting device 316 further determines if the matches a, d, and b include two qualifying matches (step 516). For example, match selecting device 316 may determine two of the matches a, d, and b that have relatively large similarity values as qualifying matches. In an exemplary embodiment, match selecting device 316 selects two of the matches a, d, and b that have the largest two similarity values, i.e., the matches a and d. Match selecting device 316 may additionally perform a distance error check on the matches a and d.

Figure 9:
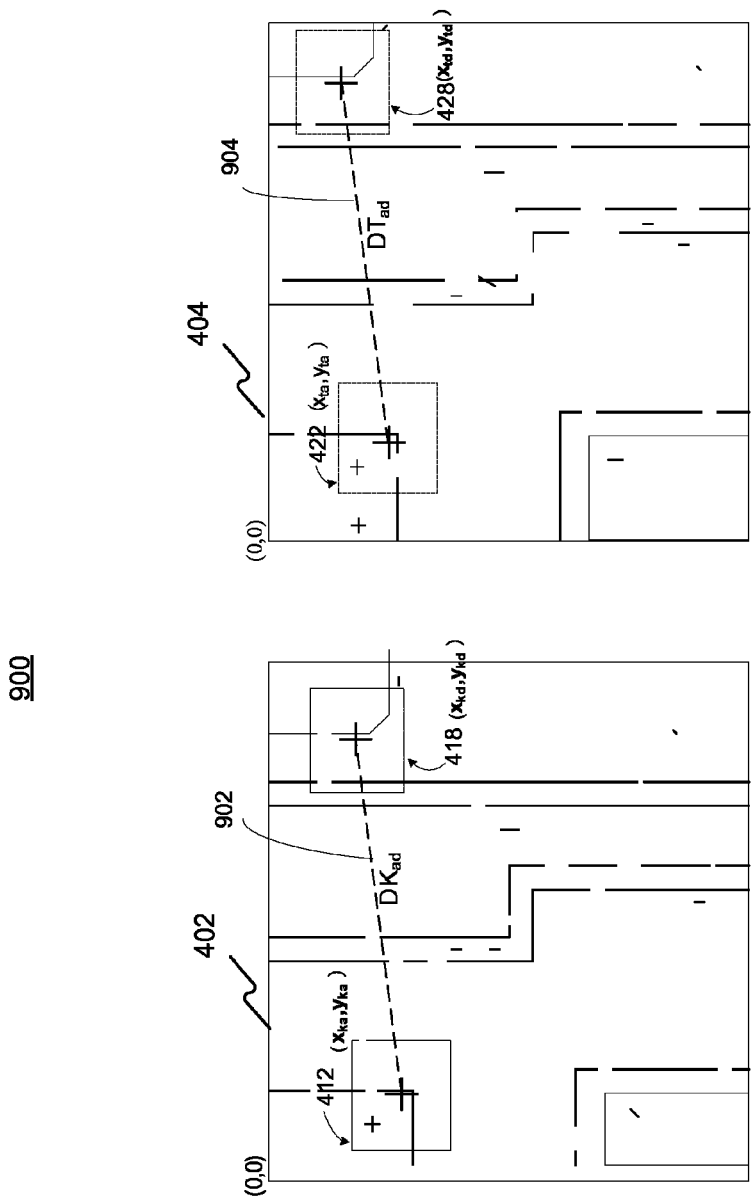
FIG. 9 illustrates a method to perform a distance error check, according to an exemplary embodiment.

FIG. 9 illustrates a method 900 to perform a distance error check, according to an exemplary embodiment. Referring to FIG. 9, for the matches a and d, match selecting device 316 (shown in FIG. 3) determines a first pattern distance $DK_{ad}$ 902 between model patterns 412 and 418 in model image 402 and a second pattern distance $DT_{ad}$ 904 between target patterns 422 and 428 in target image 404, and further determines a distance difference $DE_{ad}$ between the first and second pattern distances. Match selecting device 316 then determines if the distance difference $DE_{ad}$ is smaller than or equal to a threshold value $DE_{max}$, which is a predetermined, maximum allowable distance difference. The threshold value $DE_{max}$ may be predetermined by the user or by software installed on system 300. For example, the threshold value $DE_{max}$ may be predetermined to be 0.25 pixel.

More particularly, the pattern distance $DT_{ad}$ 904 between target patterns 422 and 428, the pattern distance $DK_{ad}$ 902 between model patterns 412 and 418, and the distance difference $DE_{ad}$ may be determined as follows:

$$DT_{ad} = \sqrt{(x_{ta} - x_{td})^2 + (y_{ta} - y_{td})^2}$$

$$DK_{ad} = \sqrt{(x_{ka} - x_{kd})^2 + (y_{ka} - y_{kd})^2}.$$

$$DE_{ad} = |DT_{ad} - DK_{ad}| \qquad \text{equation (4)}$$

In exemplary embodiments, if $DE_{ad} \leq DE_{max}$, match selecting device 316 determines that the matches a and d pass the distance error check. In this situation, although the similarity values of the matches a and d may each not be sufficiently large, due to the pattern distance $DT_{ad}$ 904 between target patterns 422 and 428 being approximately equal to the pattern distance $DK_{ad}$ 902 between model patterns 412 and 418, the matches a and d are considered as qualifying matches passing the distance error check, and can be used to determine the overall similarity value and the overall geometry relationship between model image 402 and target image 404. If $DE_{ad} > DE_{max}$, match selecting device 316 further selects from remaining ones of the matches a, d, and b another match that has a similarity value greater than the second threshold value $T_2$. In the illustrated embodiment, the match b also has a similarity value greater than the second threshold value $T_2$ and is therefore selected. Match selecting device 316 then performs distance error check on the matches a and b or the matches d and b, similar to the above description. If, e.g., the matches a and b have a distance difference smaller than the threshold $DE_{max}$, the matches a and b are qualifying matches passing the distance error check, and may be further used to determine the overall similarity value and the overall geometry relationship between model image 402 and target image 404. Here in this exemplary embodiment, the distance error is absolute error. In a slightly different embodiment, the distance error can be relative error as $DE_{ad}/DK_{ad}$ and the corresponding threshold $DE_{max}$ will be changed accordingly as a percentage.

Referring to FIGS. 3-5, in exemplary embodiments, if the matches a and d are qualifying matches passing the distance error check, computing device 318 computes the overall similarity value and the overall relative geometric relationship between model image 402 and target image 404, based on the similarity value $r_a$ and the relative geometric relationship of the match a, and the similarity value $r_d$ and the relative geometric relationship of the match d, using a non-weighted average method or a weighted average method (step 518).

More specifically, in the non-weighted average method, the overall similarity value R, the location offsets Dx in the X direction and Dy in the Y direction, the overall relative rotation D$\theta$, and the overall scaling ratio Ds, all between model image 402 and target image 404, may be computed as follows:

$$Dx = (dx_a + dx_d)/2$$

$$Dy = (dy_a + dy_d)/2$$

$$R = [(r_a + r_d)W_2] < 1.0$$

$$D\theta = (d\theta_a + d\theta_d)/2$$

$$Ds = (ds_a + ds_d)/2, \qquad \text{equation (5)}$$

where $W_2$ is a conversion coefficient between 0 and 1, $R = [(r_a + r_d)W_2] < 1.0$ indicates that a product of $W_2$ and a sum of $r_a$ and $r_b$ is truncated to be smaller than 1. Converting the similarity values $r_a$ and $r_b$ of the two matches a and d into the single overall similarity value R may help better compare the matching result with that of other methods in a unified way. The value of the conversion coefficient $W_2$ may be determined by software installed on system 300 or determined by the user. For example, the value of the conversion coefficient $W_2$ may be determined to be 0.8.

In the weighted average method, the overall similarity value R, the overall distance offsets Dx in the X direction and Dy in the Y direction, the overall relative rotation angle D$\theta$, and the overall scaling ratio Ds, all between model image 402 and target image 404, may be computed as follows:

$$w_a = r_a/(r_a + r_d)$$

$$w_d = r_d/(r_a + r_d)$$

$$Dx = w_a dx_a + w_d dx_d$$

$$Dy = w_a dy_a + w_d dy_d$$

$$R = [(r_a + r_d)W_2] < 1.0$$

$$D\theta = w_a d\theta_a + w_d d\theta_d$$

$$Ds = w_a ds_a + w_d ds_d, \qquad \text{equation (6)}$$

where $w_a$ and $w_d$ are normalized weights for the qualifying matches a and d, respectively. Equation (6) shows that the normalized weights $w_a$ and $w_d$ are proportional to the similarity values of the matches a and d, respectively. In addition, similar to the above description, $W_2$ is a conversion coefficient between 0 to 1, and $R = [(r_a + r_d)W_2] < 1.0$ indicates that a product of $W_2$ and a sum of $r_a$ and $r_b$ is truncated to be smaller than 1. Equation (6) also shows that the location offsets Dx in the X direction and Dy in the Y direction, the overall relative rotation angle D$\theta$, and the overall scaling ratio Ds between model image 402 and target image 404 are each equal to a weighted sum of those for the matches a and d.

In exemplary embodiments, if there are fewer than two matches having a similarity value greater than or equal to the second threshold value $T_2$, or if there are fewer than two qualifying matches passing the distance error check, match selecting device 316 determines if at least three of the selected matches a, d, and b each have a similarity value greater than or equal to the lowest threshold value $T_3$ (step 520). For example, $T_3$ may be set to be equal to 0.4.

If at least three of the selected matches a, d, and b each have a similarity value greater than or equal to the lowest threshold value $T_3$, match selecting device 316 determines three matches as qualifying matches (step 522). For example, match selecting device 316 may select all of the matches a, d, and b. Match selecting device 316 may additionally perform a distance error check for the matches a, d, and b.

Figure 10:
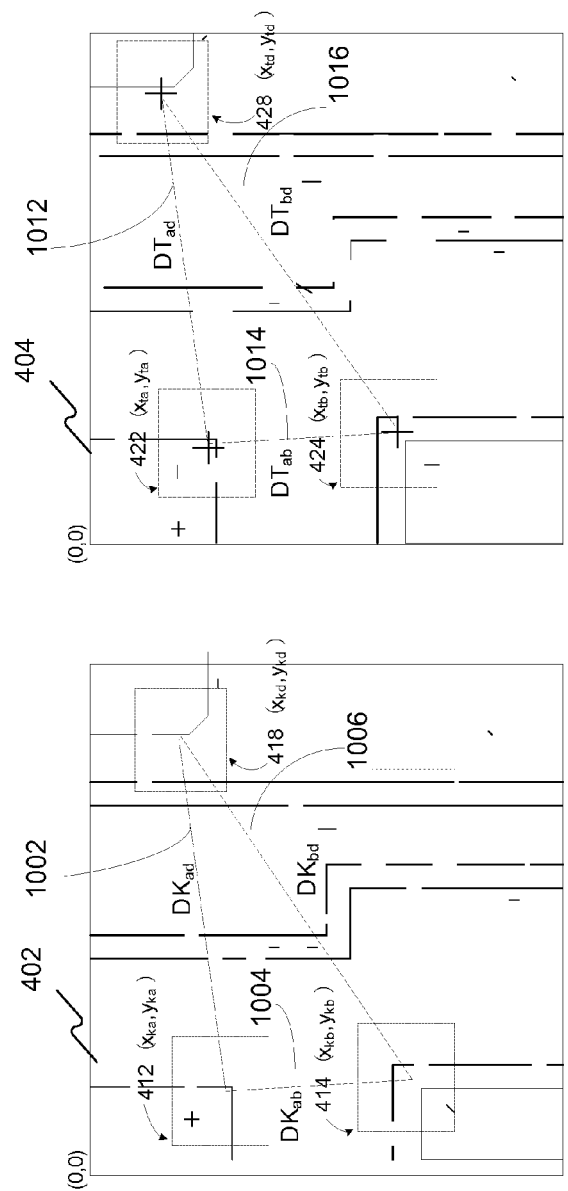
FIG. 10 illustrates a method to perform a distance error check, according to an exemplary embodiment.

FIG. 10 illustrates a method 1000 to perform a distance error check, according to an exemplary embodiment. Referring to FIG. 10, match selection device 316 (shown in FIG. 3) determines a pattern distance between any two patterns in each of model image 402 and target image 404, including pattern distance 1002 between model patterns 412 and 418, a pattern distance 1004 between model patterns 412 and 414, a pattern distance 1006 between model patterns 414 and 418, a pattern distance 1012 between target patterns 422 and 428, a pattern distance 1014 between target patterns 422 and 424, and a pattern distance 1016 between target patterns 424 and 428. For each qualifying match i ("i" represents "a," "d," or "b"), match selecting device 316 determines if a smaller one of a first distance difference $DE_{ij}$ and a second distance difference $DE_{ik}$, where j and k are indexes for the remaining two matches, is smaller than or equal to a threshold value $DE_{max}$, which is a predetermined, maximum allowable distance difference. The first distance difference $DE_{ij}$ is between the match i and the match j, and the second distance difference $DE_{ik}$ is between the match i and the match k. More particularly, the first distance difference $DE_{ij}$ may be determined as follows:

$$DT_{ij} = \sqrt{(x_{ti} - x_{tj})^2 + (y_{ti} - y_{tj})^2}$$

$$DK_{ij} = \sqrt{(x_{ki} - x_{kj})^2 + (y_{ki} - y_{kj})^2}, i, j \in \{a, d, b\}, i \neq j.$$

$$DE_{ij} = |DT_{ij} - DK_{ij}|$$

where $DT_{ij}$ is a pattern distance between two target patterns in the matches i and j, and $DK_{ij}$ is a pattern distance between two model patterns in the matches i and j.

For example, for the match a, two distance differences $DE_{ad}$ and $DE_{ab}$ may be determined with respect to the matches d and b, respectively. The smaller one of the two distance differences $DE_{ad}$ and $DE_{ab}$ is considered as the distance difference for the match a as $DE_a$.

In exemplary embodiments, if the distance error for any one of the three matches, e.g., $DE_a$ of the match a, is greater than the threshold value $DE_{max}$, the match a may not be used to determine the overall similarity value and the overall geometry relationship between model image 402 and target image 404. If this occurs, an additional match having a similarity value greater than the lowest threshold $T_3$ may be selected to replace the match a. This process may be repeated until there are three qualifying matches passing the distance error check, i.e., the distance differences for the three matches are each smaller than or equal to the threshold value $DE_{max}$. If there are more than three matches each having a similarity value greater than or equal to the threshold $T_3$, all of those matches may be involved in the distance error check, and three of those matches that have least distance differences may be used to determine the overall similarity value and the overall geometry relationship between target image 404 and model image 402. Similar to the 2 qualifying mature case, here the distance error is absolute error, but relative distance error can also be used. Using multiple matches, e.g., three matches, to determine the overall similarity value and the overall geometry relationship between target image 404 and model image 402 may provide relatively accurate results, even when the similarity values for the multiple matches may each not be sufficiently high.

Referring to FIGS. 3-5, in exemplary embodiments, if the matches a, d, and b are qualifying matches passing the distance error check, computing device 318 determines the overall similarity value and the overall relative geometric relationship between target image 404 and model image 402, based on the similarity value $r_a$ and the relative geometric relationship of the match a, the similarity value $r_d$ and the relative geometric relationship of the match d, and the similarity value $r_b$ the relative geometric relationship of the match b, using a non-weighted average method or a weighted average method (step 524).

More specifically, in the non-weighted average method, the overall similarity value R, the location offsets Dx in the X direction and Dy in the Y direction, the overall relative rotation angle $D\theta$, and the overall scaling ratio Ds, all between model image 402 and target image 404, may be computed as follows:

$$Dx = (dx_a + dx_d + dx_b)/3$$

$$Dy = (dy_a + dy_d + dy_b)/3$$

$$R = [(r_a + r_d + r_b)W_3] < 1.0$$

$$D\theta = (d\theta_a + d\theta_d + d\theta_b)/3,$$

$$Ds = (ds_a + ds_d + ds_b)/3 \qquad \text{equation (8)}$$

where $W_3$ is a conversion efficient between 0 and 1, $R = [(r_a + r_d + r_b)W_3] < 1.0$ indicates that a product of $W_3$ and a sum of $r_a$, $r_d$, and $r_b$ is truncated to be smaller than 1. Converting the similarity values $r_a$, $r_d$, and $r_b$ of the three matches into the single overall similarity value R may help better compare the matching result with that of other methods in a unified way. The value of the conversion coefficient $W_3$ may be automatically determined by software installed on system 300 or may be determined by the user. For example, the value of the conversion coefficient $W_3$ may be determined to be 0.8.

In the weighted average method, the qualifying matches a, d, and b are used to determine weights. For example, the weight of each qualifying match a, d, or b may be set to be proportional to its similarity value. Therefore the weight $w_i$ for the qualifying match i ("i" represents "a," "d," or "b") may be determined as follows:

$$w_i = r_i / (r_a + r_d + r_b). \qquad \text{equation (9)}$$

The overall similarity value R, the distance offsets Dx in the X direction and Dy in the Y direction, the overall relative rotation angle $D\theta$, and the overall scaling ratio Ds, all between model image 402 and target image 404, may be computed as follows:

$$Dx = w_a dx_a + w_d dx_d + w_b dx_b$$

$$Dy = w_a dy_a + w_d dy_d + w_b dy_b$$

$$R = [(r_a + r_d + r_b)W_3] < 1.0$$

$$D\theta = w_a d\theta_a + w_d d\theta_d + w_b d\theta_b.$$

$$Ds = w_a ds_a + w_d ds_d + w_b ds_b \qquad \text{equation (10)}$$

In an exemplary embodiment, for each qualifying match i, a smaller one $DE_i$ of a first distance difference $DE_{ij}$ determined between the qualifying matches i and j and a second distance difference $DE_{ik}$ determined between the qualifying matches i and k, i.e., $DE_i = \min(DE_{ij}, DE_{ik})$, may be used to compute a weight $DCW_i$ for the qualifying match i.

Figure 11:
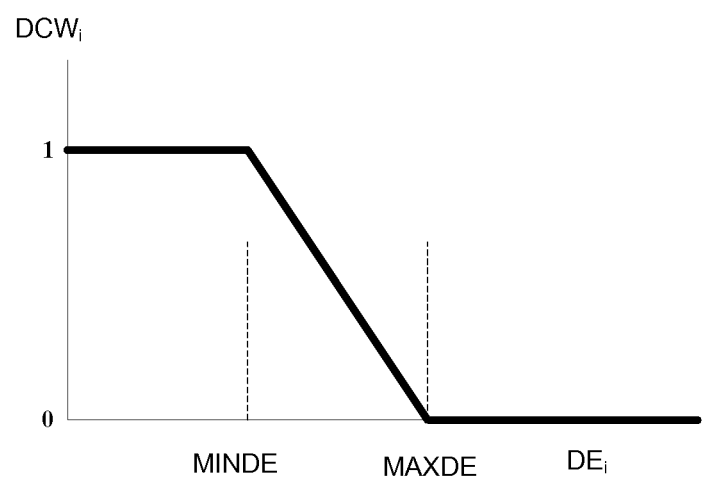
FIG. 11 shows an exemplary step function, according to an exemplary embodiment.

For example, the weight $DCW_i$ for the qualifying match i may be determined based on a step function as follows:

$$DCW_i = \begin{cases} 1, & DE_i \leq MINDE \\ aDE_i + b, & MINDE < DE_i < MAXDE \\ 0, & DE_i \geq MAXDE, \end{cases} \quad \text{equation (11)}$$

where $a = \dfrac{1}{MAXDE - MINDE}$, $b = -aMAXDE, i \in \{a, d, b\}$, and MAXDE and MINDE are first and second partition points, respectively, in the step function. FIG. 11 shows an exemplary step function 1100, according to an exemplary embodiment. The values of MAXDE and MINDE may be predetermined by the user or by software installed on system 300. For example, MAXDE may be predetermined to be equal to 0.25 pixel, and MINDE may be predetermined to be equal to 0.05 pixel. Other methods, e.g., a non-linear function method, may also be used to determine the weight for each qualifying match i. In general, as a distance difference for the match i increases, a weight for the match i decreases in computation.

In exemplary embodiments, based on the determined weights for the qualifying matches a, d, and b, the normalized weights for the qualifying matches a, d, and b may be further determined as follows:

$$w_i = DCW_i \bigg/ \sum_{i=1}^{N} DCW_i, \quad \text{equation (12)}$$

where $i \in \{a, d, b\}$, and N is a number of the qualifying matches.

In exemplary embodiments, in the weighted average method, the overall similarity value R, the overall distance offsets Dx in the X direction and Dy in the Y direction, the overall relative rotation angle D$\theta$, and the overall scaling ratio Ds, all between model image 402 and target image 404, may be computed as follows:

$Dx = w_a dx_a + w_d dx_d + w_b dx_b$, $Dy = w_a dy_a + w_d dy_d + w_b dy_b$, $R = [(DCW_a r_a + DCW_d r_d + DCW_b r_b)W_3] < 1.0$ $D\theta = w_a d\theta_a + w_d d\theta_d + w_b d\theta_b$.

$Ds = w_a ds_a + w_d ds_d + w_b ds_b \quad \text{equation (13)}$

While embodiments have been described based on image pattern matching for wafer alignment in manufacture or inspection of an LSIC, the disclosure is not so limited. It may be practiced with equal effectiveness with other manufacture and inspection processes using image pattern matching techniques, such as solar cell manufacture and inspection.

Other embodiments will be apparent to those skilled in the art from consideration of the specification and practice of embodiments disclosed herein. The scope of the appended claims is intended to cover any variations, uses, or adaptations of the disclosure following the general principles thereof and including such departures from the disclosure as come within known or customary practice in the art. It is intended that the specification and examples be considered as exemplary only, with a true scope and spirit of the invention being indicated by the following claims.

What is claimed is:

1. A computer-implemented image pattern matching method for wafer alignment, for determining an overall similarity value and an overall geometry relationship between a target wafer image and a model wafer image, the method comprising:

determining a plurality of model patterns in the model wafer image;

searching the target wafer image to identify a plurality of target patterns, one of the plurality of target patterns matching a corresponding one of the plurality of model patterns, thereby generating a plurality of matches each including a respective target pattern and model pattern;

selecting, using multiple threshold values, ones of the plurality of matches according to a plurality of similarity values, each one of the plurality of matches having one of the plurality of similarity values indicating a similarity between the target pattern and the model pattern in the one of the plurality of matches; and determining, using a predetermined algorithm and the selected ones of the matches, the overall similarity value and the overall geometry relationship between the target wafer image and the model wafer image, wherein if a largest one of the plurality of similarity values is greater than or equal to a first threshold value, the selecting comprises selecting a first match of the plurality of matches that has the largest one of the plurality of similarity values, and the determining of the overall similarity value and the overall geometry relationship comprises determining the similarity value and a geometry relationship between the target pattern and the model pattern in the first match as the overall similarity value and the overall geometry relationship between the target wafer image and the model wafer image, respectively; and wherein if each of the plurality of similarity values is smaller than the first threshold value, the selecting comprises selecting multiple matches of the plurality of matches that each have a similarity value greater than a different threshold value that is smaller than the first threshold value; and the determining of the overall similarity value and the overall geometry relationship comprises determining the overall similarity and the overall geometry relationship using:

ones of the selected multiple matches that have relatively large similarity values among the selected multiple matches, or ones of the selected multiple matches that correspond to a relatively small difference in pattern distance among the selected multiple matches.

2. The method of claim 1, wherein if each of the plurality of similarity values is smaller than the first threshold, the selecting of the multiple matches comprises:

selecting at least two of the plurality of matches that each have a similarity value greater than a second threshold value, the second threshold value being smaller than the first threshold value, to determine the overall similarity value and the overall geometry relationship.

3. The method of claim 2, wherein the determining using the at least two of the plurality of matches comprises:

determining two matches from the at least two of the plurality of matches as qualifying matches, the two qualifying matches having the largest two similarity values among the at least two of the plurality of matches, or the two qualifying matches having a distance difference between first and second pattern distances of the two qualifying matches smaller than a first predetermined difference threshold value, the first pattern distance being between the model patterns of the two qualifying matches and the second pattern distance being between the corresponding target patterns of the two qualifying matches; and computing, using the similarity value and the geometry relationship of the target pattern and the model pattern of each of the two qualifying matches, the overall similarity value and the overall geometry relationship between the target wafer image and the model wafer image using a non-weighted average method or a weighted average method.

4. The method of claim 3, wherein the computing using the weighted average method comprises:

determining first and second weights for the two qualifying matches, respectively, and determining first and second normalized weights for the two qualifying matches, respectively;

computing, using the first and second weights, a weighted sum of the similarity values of the first and second matches to obtain the overall similarity value between the target wafer image and the model wafer image, and computing, using the first and second normalized weights, a weighted sum of the geometry relationships of the two qualifying matches, to obtain the overall geometry relationship between the target wafer image and the model wafer image.

5. The method of claim 1, wherein if each of the plurality of similarity values is smaller than the first threshold value, the selecting of the multiple matches further comprises:

selecting at least three of the plurality of matches that each have a similarity value greater than a third threshold value, the third threshold value being smaller than the first threshold value, to determine the overall similarity value and the overall geometry relationship.

6. The method of claim 5, wherein the determining using the at least three of the plurality of matches comprises:

determining three matches from the at least three of the plurality of matches as qualifying matches, the three qualifying matches having the largest three similarity values among the at least three of the plurality of matches, or the three qualifying matches having three distance differences, respectively, each smaller than a second predetermined difference threshold value, wherein each of the three distance differences is a smaller one of first and second distance differences, the first distance difference being between a model pattern distance of first and second ones of the three qualifying matches and a target pattern distance of the first and second ones of the three qualifying matches, the second distance difference being between a model pattern distance of the first one and a third one of the three qualifying matches and a target pattern distance of the first and third ones of the three qualifying matches; and computing, using the similarity value and the geometry relationship of the target pattern and the model pattern of each of the three qualifying matches, the overall similarity value and the overall geometry relationship between the target wafer image and the model wafer image using a non-weighted average method or a weighted average method.

7. The method of claim 6, wherein the determining using the weighted average method comprises:

determining first, second, and third weights for the three qualifying matches, respectively, and determining first, second, and third normalized weights for the three qualifying matches, respectively;

computing, using the first, second, and third weights, a weighted sum of the similarity values of the first, second, third matches to obtain the overall similarity value of the target wafer image and the model wafer image; and computing, using the first, second, third normalized weights, a weighted sum of the geometry relationships of the three qualifying matches, to obtain the overall geometry relationship of the target wafer image and the model wafer image.

8. The method of claim 7, wherein determining the first, second, and third weights comprises:

determining the first, second, and third weights using the similarity values of the three qualifying matches, the first, second, and third weights increasing as the similarity values of the three qualifying matches increase, respectively; or determining the first, second, and third weights, respectively, using the three distance differences each smaller than the second predetermined difference threshold value.

9. The method of claim 8, wherein determining the first weight comprises:

determining the first weight using a segmented function with a difference in pattern distance being an independent variable, wherein the determining using the segmented function includes:

determining the first weight to be one if the difference in pattern distance is smaller than or equal to a predetermined minimum difference;

determining the first weight to be zero if the difference in pattern distance is greater than or equal to a predetermined maximum difference; and determining the first weight to a value between zero and one if the difference in pattern distance is greater than the predetermined maximum difference and smaller than the predetermined maximum difference, the first weight decreasing as the difference in pattern distance increases.

10. The method of claim 4, wherein the determining using the weighted average method further comprises:

computing a product of a conversion efficient and a sum of the first and second weights to obtain the similarity value of the target wafer image and the model wafer image, the conversion efficient being greater than or equal to zero and being smaller than or equal to one.

11. The method of claim 1, wherein the target wafer image and the model wafer image each comprise at least one of: a binary image, a grayscale image, and a color image, wherein the target wafer image and the model wafer image are each acquired using at least one of a charge-coupled device (CCD) based imaging technique, a complementary metal-oxide-semiconductor (CMOS) based imaging technique, an X-ray imaging technique, and an electron or ion beam microscopy imaging technique, and wherein searching the target wafer image comprises using at least one of a normalized cross-correlation (NCC) algorithm and a similarity computation algorithm.

12. The method of claim 1, wherein the geometry relationship comprises:
  at least one of a location offset, a relative rotation angle, and a scaling ratio.

13. An image pattern matching system for performing wafer alignment, comprising:
  a wafer imaging device for acquiring an image of a wafer as a target wafer image;
  a model pattern determining device for determining a plurality of model patterns in a stored model wafer image;
  a pattern matching device for searching, using an image pattern matching technique, the target wafer image to identify a plurality of target patterns, one of the plurality of target patterns matching a corresponding one of the plurality of model patterns, thereby generating a plurality of matches each including a respective target pattern and model pattern;
  a match selecting device for selecting, using multiple threshold values, ones of the plurality of matches according to a plurality of similarity values, each one of the plurality of matches having one of the plurality of similarity values indicating a similarity between the target pattern and the model pattern in the one of the plurality of matches; and
  a computing device for determining, using a predetermined algorithm and the selected ones of the matches, the overall similarity value and the overall geometry relationship between the target wafer image and the model wafer image,
  wherein if a largest one of the plurality of similarity values is greater than or equal to a first threshold value,
    the match selecting device selects a first match of the plurality of matches that has the largest one of the plurality of similarity values, and
    the computing device determines the similarity value and a geometry relationship between the target pattern and the model pattern in the first match as the overall similarity value and the overall geometry relationship between the target wafer image and the model wafer image, respectively; and
  wherein if each of the plurality of similarity values is smaller than the first threshold value,
    the match selecting device selects multiple matches of the plurality of matches that each have a similarity value greater than a different threshold value that is smaller than the first threshold value; and
    the computing device computes the overall similarity and the overall geometry relationship using:
      ones of the selected multiple matches that have relatively lame similarity values among the selected multiple matches, or
      ones of the selected multiple matches that correspond to a relative small difference in pattern distance among the selected multiple matches.

14. The system of claim 13, wherein if each of the plurality of similarity values is smaller than the first threshold, the match selecting device:
  further selects at least two of the plurality of matches that each have a similarity value greater than a second threshold value, the second threshold value being smaller than the first threshold value, to determine the overall similarity value and the overall geometry relationship.

15. The system of claim 14, wherein the computing device:
  determines two matches from the at least two of the plurality of matches as qualifying matches, the two qualifying matches having the largest two similarity values among the at least two of the plurality of matches, or the two qualifying matches having a distance difference between first and second pattern distances of the two qualifying matches smaller than a first predetermined difference threshold value, the first pattern distance being between the model patterns of the two qualifying matches and the second pattern distance being between the corresponding target patterns of the two qualifying matches; and
  computes, using the similarity value and the geometry relationship of the target pattern and the model pattern of each of the two qualifying matches, the overall similarity value and the overall geometry relationship between the target wafer image and the model wafer image using a non-weighted average method or a weighted average method.

16. The system of claim 15, wherein, using the weighted average method, the computing device:
  determines first and second weights for the two qualifying matches, respectively, and determine first and second normalized weights for the two qualifying matches, respectively;
  computes, using the first and second weights, a weighted sum of the similarity values of the first and second matches to obtain the overall similarity value between the target wafer image and the model wafer image, and
  computes, using the first and second normalized weights, a weighted sum of the geometry relationships of the two qualifying matches, to obtain the overall geometry relationship between the target wafer image and the model wafer image.

17. The system of claim 13, wherein if each of the plurality of similarity values is smaller than the first threshold value, the match selecting device:
  selects at least three of the plurality of matches that each have a similarity value greater than a third threshold value, the third threshold value being smaller than the first threshold value, to determine the overall similarity value and the overall geometry relationship.

18. The system of claim 17, wherein the computing device:
  determines three matches from the at least three of the plurality of matches as qualifying matches, the three qualifying matches having the largest three similarity values among the at least three of the plurality of matches, or the three qualifying matches having three distance differences, respectively, each smaller than a second predetermined difference threshold value, wherein each of the three distance differences is a smaller one of first and second distance differences, the first distance difference being between a model pattern distance of first and second ones of the three qualifying matches and a target pattern distance of the first and second ones of the three qualifying matches, the second distance difference being between a model pattern distance of the first one and a third one of the three qualifying matches and a target pattern distance of the first and third ones of the three qualifying matches; and
  computes, using the similarity value and the geometry relationship of the target pattern and the model pattern of each of the three qualifying matches, the overall similarity value and the overall geometry relationship between the target wafer image and the model wafer image using a non-weighted average method or a weighted average method.

19. The system of claim 18, wherein, using the weighted average method, the computing device:
  determines first, second, and third weights for the three qualifying matches, respectively, and determine first, second, and third normalized weights for the three qualifying matches, respectively;

computes, using the first, second, and third weights, a weighted sum of the similarity values of the first, second, third matches to obtain the overall similarity value of the target wafer image and the model wafer image; and computes, using the first, second, third normalized weights, a weighted sum of the geometry relationships of the three qualifying matches, to obtain the overall geometry relationship of the target wafer image and the model wafer image.

20. The system of claim 19, wherein the computing device:
determines the first, second, and third weights using the similarity values of the three qualifying matches, the first, second, and third weights increasing as the similarity values of the three qualifying matches increase, respectively; or determines the first, second, and third weights, respectively, using the three distance differences each smaller than the second predetermined difference threshold value.

21. The system of claim 20, wherein the computing device:
determines the first weight using a segmented function with a difference in pattern distance being an independent variable, wherein the determining using the segmented function includes:
  determining the first weight to be one if the difference in pattern distance is smaller than or equal to a predetermined minimum difference;
  determining the first weight to be zero if the difference in pattern distance is greater than or equal to a predetermined maximum difference; and
  determining the first weight to a value between zero and one if the difference in pattern distance is greater than the predetermined maximum difference and smaller than the predetermined maximum difference, the first weight decreasing as the difference in pattern distance increases.

22. The system of claim 16, wherein the computing device:
computes a product of a conversion efficient and a sum of the first and second weights to obtain the similarity value of the target wafer image and the model wafer image, the conversion efficient being greater than or equal to zero and being smaller than or equal to one.

23. The system of claim 13,
wherein the target wafer image and the model wafer image each comprise at least one of: a binary image, a grey-scale image, and a color image,
wherein the target wafer image and the model wafer image are each obtained by at least one of a charge-coupled device (CCD) based imaging technique, a complementary metal-oxide-semiconductor (CMOS) based imaging technique, an X-ray imaging technique, and an electron or ion beam microscopy imaging technique, and
wherein the image pattern matching technique comprises at least one of a normalized cross-correlation (NCC) algorithm and a similarity computation algorithm.

24. The system of claim 13, wherein the geometry relationship comprises:
at least one of a location offset, a relative rotation angle, and a scaling ratio.

* * * * *

UNITED STATES PATENT AND TRADEMARK OFFICE
CERTIFICATE OF CORRECTION

PATENT NO. : 8,538,168 B2  
APPLICATION NO. : 12/854536  
DATED : September 17, 2013  
INVENTOR(S) : Lisong Liu Page 1 of 1

It is certified that error appears in the above-identified patent and that said Letters Patent is hereby corrected as shown below:

In the Claims

Claim 13, Col. 19, Line 50, "lame" should read as --large--.

Signed and Sealed this  
Thirty-first Day of December, 2013

Margaret A. Focarino  
*Commissioner for Patents of the United States Patent and Trademark Office*